US011113080B2

(12) United States Patent
Tommy et al.

(10) Patent No.: US 11,113,080 B2
(45) Date of Patent: Sep. 7, 2021

(54) CONTEXT BASED ADAPTIVE VIRTUAL REALITY (VR) ASSISTANT IN VR ENVIRONMENTS

(71) Applicant: TATA CONSULTANCY SERVICES LIMITED, Mumbai (IN)

(72) Inventors: Robin Tommy, Trivandrum (IN); Vansh Johri, Trivandrum (IN)

(73) Assignee: Tata Consultancy Services Limited, Mumbai (IN)

( * ) Notice: Subject to any disclaimer, the term of this patent is extended or adjusted under 35 U.S.C. 154(b) by 95 days.

(21) Appl. No.: 15/473,034

(22) Filed: Mar. 29, 2017

(65) Prior Publication Data
US 2018/0225131 A1 Aug. 9, 2018

(30) Foreign Application Priority Data

Feb. 6, 2017 (IN) .............................. 201721004213

(51) Int. Cl.
*G06F 3/048* (2013.01)
*G06F 9/451* (2018.01)
*G06F 16/245* (2019.01)
*G06F 3/01* (2006.01)
*G06F 3/0482* (2013.01)

(52) U.S. Cl.
CPC .............. *G06F 9/453* (2018.02); *G06F 3/011* (2013.01); *G06F 3/0482* (2013.01); *G06F 16/245* (2019.01); *G06F 9/451* (2018.02)

(58) Field of Classification Search
CPC .......... G06F 3/012; G06F 3/013; G06F 3/014; G06F 3/015; G06F 3/016; G06F 3/017; G06F 17/30994; G06F 9/453; G06F 16/245; G06F 3/011; G06F 3/482; G06F 9/451; G06T 19/006
See application file for complete search history.

(56) References Cited

U.S. PATENT DOCUMENTS

| 8,156,060 | B2 | 4/2012 | Borzestowski et al. |
| 2001/0055039 | A1* | 12/2001 | Matsuda ........... G06F 17/30994 715/848 |
| 2006/0074831 | A1 | 4/2006 | Hyder et al. |
| 2015/0074524 | A1 | 3/2015 | Nicholson et al. |
| 2016/0049094 | A1* | 2/2016 | Gupta ..................... G09B 9/00 434/185 |

(Continued)

FOREIGN PATENT DOCUMENTS

WO   WO 02/057896 A2   7/2002

*Primary Examiner* — Haoshian Shih
(74) *Attorney, Agent, or Firm* — Finnegan, Henderson, Farabow, Garrett & Dunner, LLP

(57) ABSTRACT

Systems and methods for providing adaptive virtual reality (VR) assistant in VR environments. The system is configured to receive input from users within an interactive communication session, wherein text from the input is extracted and analyzed by a Natural Language Processing (NLP) engine, and context is determined based on the input text extracted. Based on the determined context and input, the adaptive VR assistant generates a VR environment that is integrated within the same interactive communication session. The system enables a communication session between a virtual character created for the user and other virtual users within the generated VR environment based on the determined context.

9 Claims, 6 Drawing Sheets

(56) References Cited

U.S. PATENT DOCUMENTS

| | | | |
|---|---|---|---|
| 2016/0077547 A1* | 3/2016 | Aimone | G06F 3/012 345/8 |
| 2018/0101986 A1* | 4/2018 | Burns | G06T 19/006 |
| 2018/0218374 A1* | 8/2018 | Shah | G06F 16/2457 |
| 2018/0218627 A1* | 8/2018 | Smith Lewis | G06N 5/04 |

* cited by examiner

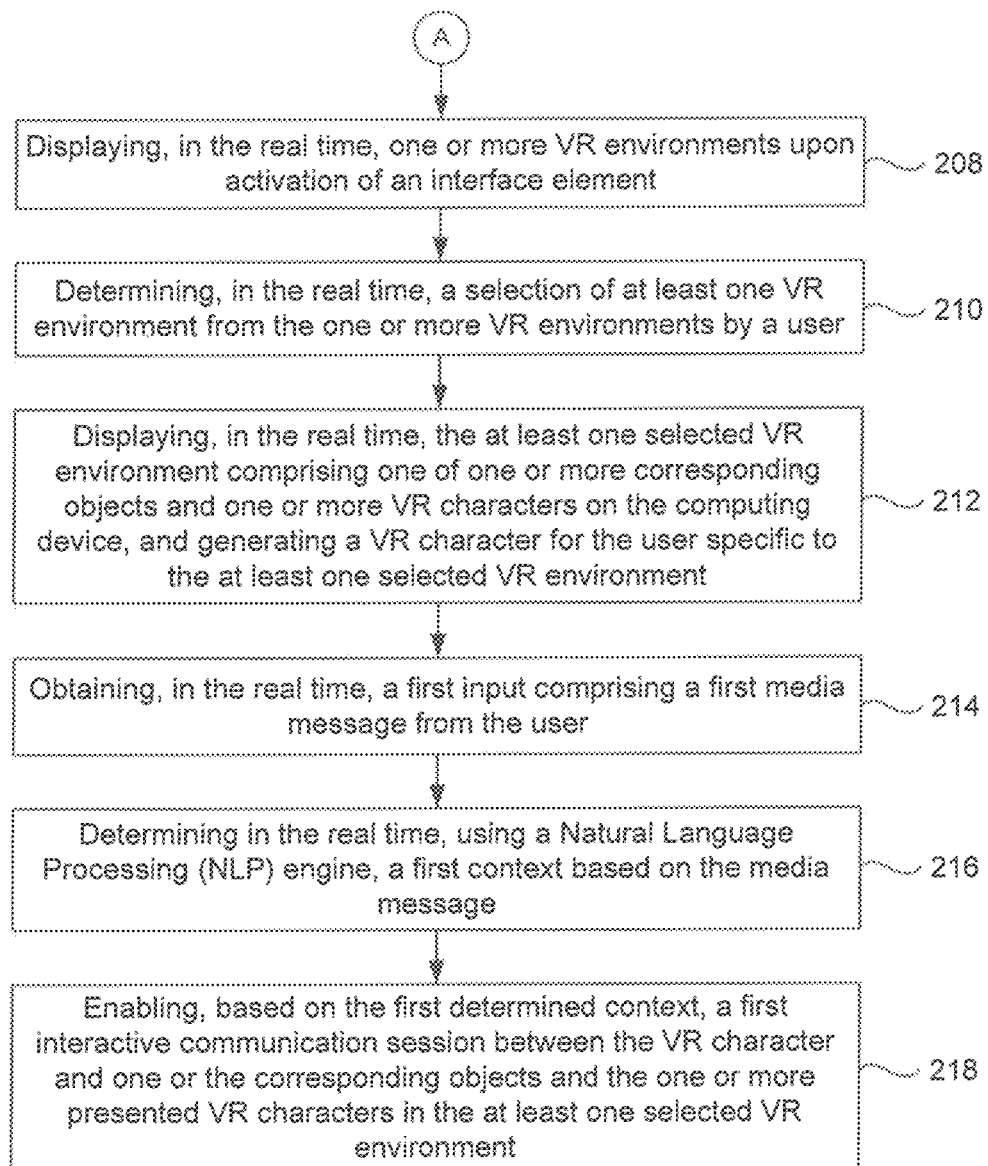
FIG. 2 (Contd)

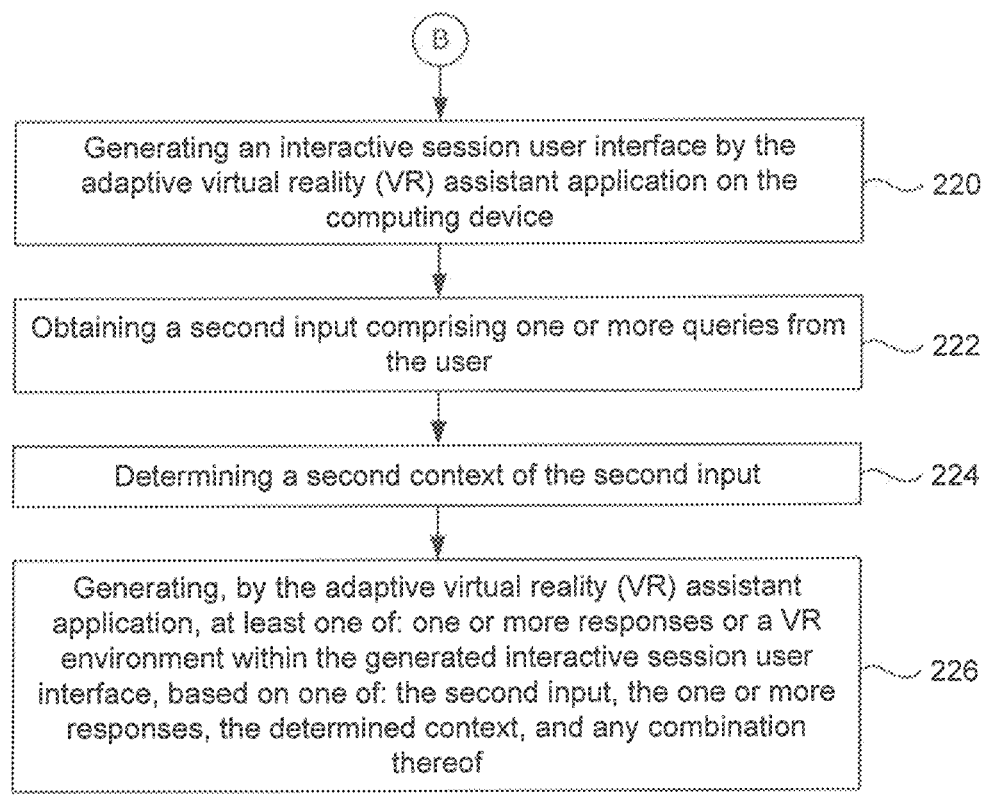
FIG. 2 (Contd)

CONTEXT BASED ADAPTIVE VIRTUAL REALITY (VR) ASSISTANT IN VR ENVIRONMENTS

PRIORITY CLAIM

This U.S. patent application claims priority under 35 U.S.C. § 119 to: India Application No. 201721004213, filed on Feb. 6, 2017. The entire contents of the aforementioned application are incorporated herein by reference.

TECHNICAL FIELD

The disclosure herein generally relate to virtual assistant systems, and, more particularly, to context based adaptive virtual reality (VR) assistant for VR environments.

BACKGROUND

With the advent of technologies, computer systems and mobile communication devices have become demanding resources to processing data, for example, user requests. As such, dedicating a live human representative to process user requests has been extremely expensive and is not efficient for long terms. Attempts have also been made to replace human representatives with artificial intelligence (AI) based virtual assistants to respond to user requests, and largely mimic actions of human beings during communication interactions. This has resulted in Investing significant time, cost and effort in training such AI based virtual assistants for training and then making them learn from the training and adopt to various scenarios. However, the ability of responding to user requests at least in part has been dependent on the ability of AI engine and the level of training VR assistants receive. Additionally, the VR assistants at times, find it difficult to identify or recognize the user requests and map them to appropriate functions. This has led to providing poor services in response to receiving user requests.

SUMMARY

Embodiments of the present disclosure present technological improvements as solutions to one or more of the above-mentioned technical problems recognized by the inventors in conventional systems.

For example, in one aspect, a method for providing a context based virtual reality assistant in one or more VR environments. The method comprising providing an adaptive virtual reality (VR) assistant application executable by at least one processor configured for VR assistance on a computing device; detecting, by the adaptive VR assistant application, activation of an interface element from a plurality of interface elements; and executing, upon the activation of the interface element, at least one of a first set of instructions and a second set of instructions, wherein the first set of instructions comprises; displaying, in the real time, one or more VR environments upon activation of an interface element; determining, in the real time, a selection of at least one VR environment from the one or more VR environments by a user; displaying, in the real time, the at least one selected VR environment comprising one of one or more corresponding objects and one or more VR characters on the computing device, and generating a VR character for the user specific to the at least one selected VR environment; obtaining, in the real time, a first input comprising a first media message from the user; determining in the real time, using a Natural Language Processing (NLP) engine, a first context based on the media message; and enabling, based on the first determined context, a first interactive communication session between the VR character and one or the corresponding objects and the one or more presented VR characters in the at least one selected VR environment, and wherein the second set of instructions comprises: generating an interactive session user interface by the adaptive VR assistant application on the computing device; obtaining a second input comprising one or more queries from the user; determining a second context of the second input; and generating, by the adaptive VR assistant application, at least one of: one or more responses or a VR environment within the generated interactive session user interface, based on one of: the second input, the one or more responses, the determined context, and any combination thereof.

In an embodiment, the first media message and the second media message may comprise at least one of a text message, an audio message, a video message, an audiovisual message, a gaze input, a gesture input, or combination thereof. In an embodiment, a second interactive communication may be enabled between the user and the corresponding objects in the generated VR environment based on the second determined context. In an embodiment, text from the first input and the second input are extracted to determine the first context and the second context respectively.

In another aspect, a computer implemented system for providing a context based virtual reality assistant in one or more VR environments is provided. The system comprising: a memory storing instructions; one or more communication interfaces; and one or more hardware processors coupled to said memory using said one or more communication interfaces, wherein said one or more hardware processors are configured by said instructions to: provide an adaptive virtual reality (VR) assistant application executable by at least one processor configured for VR assistance on a computing device; detect, by the adaptive VR assistant application, activation of an interface element from a plurality of interface elements; and execute, upon the activation of the interface element, at least one of a first set of instructions and a second set of instructions, wherein the first set of instructions comprises: displaying, in the real time, one or more VR environments upon activation of an interface element; determining, in the real time, a selection of at least one VR environment from the one or more VR environments by a user; displaying, in the real time, the at least one selected VR environment comprising one of one or more corresponding objects and one or more VR characters on the computing device, and generating a VR character for the user specific to the at least one selected VR environment; obtaining, in the real time, a first Input comprising a first media message from the user; determining in the real time, using a Natural Language Processing (NLP) engine, a first context based on the media message; and enabling, based on the first determined context, a first interactive communication session between the VR character and one or the corresponding objects and the one or more presented VR characters in the at least one selected VR environment, and wherein the second set of instructions comprises: generating an interactive session user interface by the adaptive virtual reality (VR) assistant application on the computing device; obtaining a second input comprising one or more queries from the user; determining a second context of the second input; and generating, by the adaptive VR assistant application, at least one of: one or more responses or a VR environment within the generated interactive session user interface, based on one of: the second input, the one or more responses, the determined context, and any combination thereof.

In an embodiment, the first media message and the second media message may comprise at least one of a text message, an audio message, a video message, an audiovisual message, a gaze input, a gesture input, or combination thereof. In an embodiment, the system is further configured to enable a second Interactive communication between the user and the corresponding objects in the generated VR environment based on the second determined context. In an embodiment, text from the first input and the second input are extracted to determine the first context and the second context respectively.

In yet another aspect, one or more non-transitory machine readable information storage mediums comprising one or more instructions is provided. The one or more instructions which when executed by one or more hardware processors causes providing an adaptive virtual reality (VR) assistant application executable by at least one processor configured for (or for providing) VR assistance on a computing device: detecting, by the adaptive VR assistant application, activation of an interface element from a plurality of interface elements; and executing, upon the activation of the interface element, at least one of a first set of instructions and a second set of instructions, wherein the first set of instructions comprises: displaying, in the real time, one or more VR environments upon activation of an interface element; determining, in the real time, a selection of at least one VR environment from the one or more VR environments by a user; displaying, in the real time, the at least one selected VR environment comprising one of one or more corresponding objects and one or more VR characters on the computing device, and generating a VR character for the user specific to the at least one selected VR environment: obtaining, in the real time, a first input comprising a first media message from the user; determining in the real time, using a Natural Language Processing (NLP) engine, a first context based on the media message; and enabling, based on the first determined context, a first interactive communication session between the VR character and one or the corresponding objects and the one or more presented VR characters in the at least one selected VR environment, and wherein the second set of instructions comprises: generating an interactive session user interface by the adaptive VR assistant application on the computing device; obtaining a second input comprising one or more queries from the user; determining a second context of the second input; and generating, by the adaptive VR assistant application, at least one of: one or more responses or a VR environment within the generated interactive session user interface, based on one of: the second input, the one or more responses, the determined context, and any combination thereof.

In an embodiment, the first media message and the second media message may comprise at least one of a text message, an audio message, a video message, an audiovisual message, a gaze input a gesture input, or combination thereof. In an embodiment, the instructions further cause the one or more hardware processors to enable a second interactive communication between the user and the corresponding objects in the generated VR environment based on the second determined context. In an embodiment, text from the first input and the second input are extracted to determine the first context and the second context respectively.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
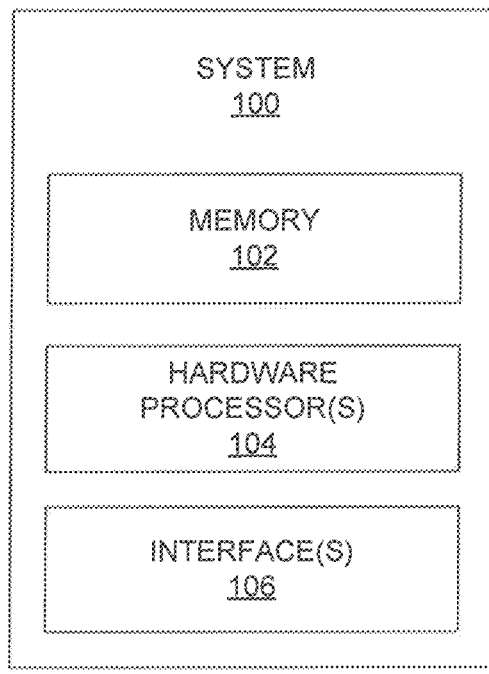
FIG. 1 illustrates an exemplary block diagram of a system for providing a virtual reality (VR) and context based virtual assistant in one or more VR environments according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates an exemplary block diagram of a system 100 for providing a virtual reality (VR) and context based virtual assistant in one or more VR environments according to an embodiment of the present disclosure. More specifically, FIG. 1 depicts an exemplary system that provides context based adaptive VR assistant in VR environments. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) (106) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
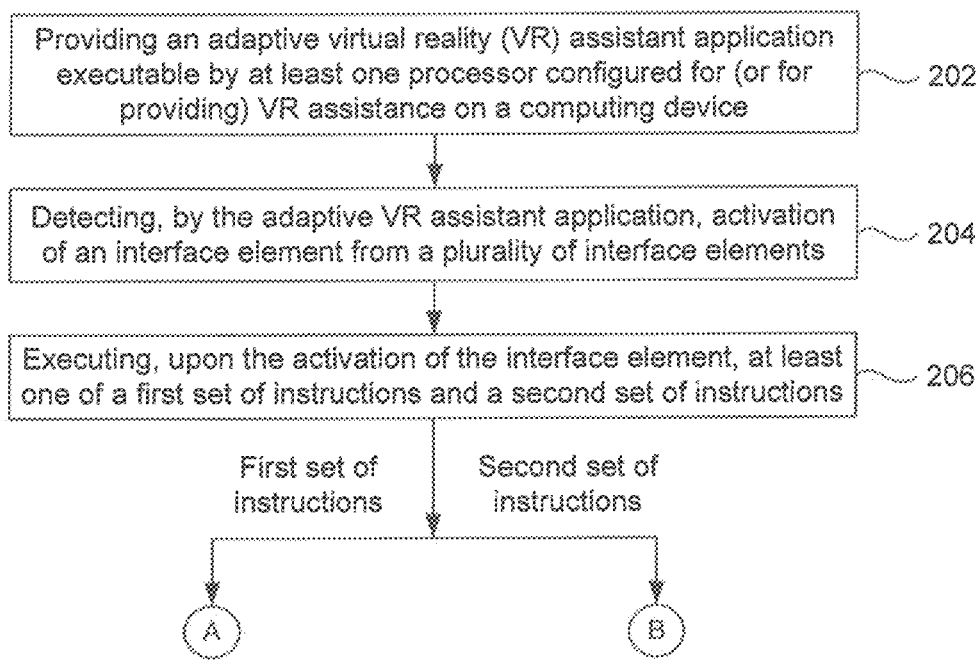
FIG. 2 illustrates an exemplary flow diagram of a method for providing a virtual reality (VR) and context based virtual assistant in one or more VR environments using the system of FIG. 1 in accordance with an embodiment of the present disclosure.

FIG. 2, with reference to FIG. 1, illustrates an exemplary flow diagram of a method for providing a virtual reality (VR) and context based virtual assistant in one or more VR environments using the system 100 of FIG. 1 in accordance with an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, and the flow diagram. In an embodiment of the present disclosure, at step 202, the one or more processors 104 provide an adaptive virtual reality (VR) assistant application executable by the one or more hardware processors 104 configured for (or for providing) VR assistance on a computing device. The expressions 'adaptive VR assistant application', 'VR assistant', 'VR assistant application', and 'VR application' may be interchangeably used herein.

In an embodiment of the present disclosure, at step 204, the one or more hardware processors 104 detect, using the adaptive VR assistant application, activation of an interface element from a plurality of interface elements. In an embodiment of the present disclosure, the plurality of interface elements may include, but not limited to, VR environment interface option, a communication session (or chat) interface option, and the like. In an embodiment of the present disclosure, at step 206, the one or more hardware processors 104 execute, upon the activation of the interface element, at least one of a first set of instructions and a second set of instructions. In an embodiment of the present disclosure, the first set of instructions comprises displaying (208), in the real time, one or more VR environments upon activation of an interface element. The method further includes determining (210), in the real time, a selection of at least one VR environment from the one or more VR environments by a user, in an embodiment of the present disclosure, at step 212, the one or more hardware processors 104 display, in the real time, the at least one selected VR environment comprising one of one or more corresponding objects and one or more VR characters on the computing device, and generates a VR character for the user specific to the at least one selected VR environment.

In an embodiment of the present disclosure, at step 214, the one or mere hardware processors 104 obtain, in the real time, a first input comprising a first media message from the user. At step 216, the one or more hardware processors 104 determine, in the real time, using a Natural Language Processing (NLP) engine, a first context based on the first media message. The Natural Language Processing engine may be stored in the memory 102 and executed on the computing device. In an embodiment of the present disclosure, at step 218, the one or more hardware processors 104, enable, based on the first determined context, a first interactive communication session between the VR character and one or the corresponding objects and the one or more presented VR characters in the at least one selected VR environment. In an embodiment, the system 100 may generate a VR assistant that enables a first interactive communication session between the VR character and one or the corresponding objects and the one or more presented VR characters in the at least one selected VR environment. In an embodiment, the system 100 may directly generate (or enable) a first interactive communication session between the VR character and one or the corresponding objects and the one or more presented VR characters in the at least one selected VR environment, wherein the system 100 may generate a virtual assistant that can help the VR character (e.g., user and other audiences) during interaction.

The second set of instructions comprises: generating (220) an interactive session user interface (also referred as 'interactive communication session user interface') by the adaptive virtual reality (VR) assistant application on the computing device. The second set of instructions further comprises: obtaining (222) a second input comprising one or more queries from the user; determining (224) a second context of the second input; and generating (226), by the adaptive virtual reality (VR) assistant application, at least one of: one or more responses or a VR environment within the generated interactive session user interface, based on one of: the second input, the one or more responses, the determined context, and any combination thereof. In an embodiment of the present disclosure, the system 100 generated one or more responses and/or the VR environment such that the generated responses and/or VR environment are integrated within the generated interactive session user interface. In an embodiment of the present disclosure, the hardware processors may further enable a second interactive communication between the user and the corresponding objects in the generated VR environment based on the second determined context.

In an embodiment of the present disclosure, the first media message and the second media message may comprise at least one of a text message, an audio message (e.g., voice), a video message, an audiovisual message, a gaze input, a gesture input, or combination thereof. In an embodiment of the present disclosure text from the first input and the second input are extracted and processed by the NIP engine to determine the first context and the second context respectively.

Figure 3:
FIG. 3 is an exemplary user interface view of a VR environment generated by the adaptive VR assistant application executed on the system of FIG. 1.

FIG. 3, with reference to FIGS. 1-2, is an exemplary user interface view of a VR environment generated by the adaptive VR assistant application executed on the system 100 of FIG. 1 according to an embodiment of the present disclosure. The adaptive VR assistant application obtains one or more inputs from the user. The inputs may comprise, but not limited to media message. Based on the text extracted from the media message, the adaptive VR assistant application generates (or renders) a VR environment as depicted in FIG. 3. Rendering of a VR environment may comprise selecting and retrieving a determined context based VR environment from one or more VR environments (stored in one or more asset repositories). For example, the user may have selected auditorium as a VR environment, and provides attending conference or speaking at an event as input (e.g., the media message) to the adaptive VR assistant application. This input is extracted by the adaptive VR assistant application and a context is determined. For example, as can be seen from the above input, the user may speak at the event in the conference. Hence the adaptive VR assistant application generates a VR character for the user (e.g., a VR speaker or a 3D avatar augmented virtual presence of real world characters), and one or more VR characters (e.g., audience) 304 who would be attending the event (e.g., virtual presence of users), in the selected VR environment 302 (e.g., auditorium). The adaptive VR assistant application may generate a VR assistant (e.g., a virtual user) that may analyse the scenario and engage with the user (e.g., VR speaker). Additionally, the adaptive VR assistant application presents, in the real time, the at least one selected VR environment comprising one of one or more corresponding objects and one or more VR characters on the computing device, and generates a VR character for the user specific to the at least one selected VR environment. More specifically, the adaptive VR assistant generates a public speaking simulator that simulates one or more VR environments based on user's selection in which the VR assistant augments the presence of user as a speaker to address the virtual audience. As depicted in FIG. 3, the user interface depicts a VR environment which involves session with virtual audience and the virtual speaker. The environment which have the virtual audience involves the interaction in which user gives the speech and audience can cross question over it, wherein this cross questioning is the audio that is coming from the NLP engine after context analysis.

Alternatively, the adaptive VR assistant application, may first receive an input comprising a media message, then extract, using the NLP engine, text from the input and determine the context. Based on the determined context, the adaptive VR assistant application generates a VR environment (e.g., in this scenario: an auditorium) and corresponding objects (e.g., stage/podium, dals, with microphone, and sound speakers etc.) and VR characters (e.g., audience) and enables an interactive communication session between the virtual audience and the virtual speaker as depicted in FIG. 3. In an embodiment of the present disclosure, the corresponding objects, virtual character (e.g., virtual speaker), and virtual users (e.g., audience) may be pre-defined and stored in one or more asset repositories (not shown in FIGS. 1-3) residing in the memory 102. The NLP engine (not shown in FIGS. 1-3 processes the media message (e.g., an audio) to extract text from the audio and then text is processed to understand the context and the final result in the form of audio/text is sent back to an asset loader (or the one or more asset repositories) which load/manipulate the content in a 3D Space (e.g., a 3D virtual reality environment).

The adaptive VR assistant application, may further activate one or more functionalities 306 that enable user of the adaptive VR assistant application to perform one or more actions in real time. In an example embodiment, the one or more functionalities may be mapped to one or more VR environments, and the information pertaining to the mapping may be stored in an association database (not shown in FIGS. 1-3) residing in the memory 102. For example, as can be seen in FIG. 3, the user is requested (or when the user focuses) to focus in one direction and for a predefined time interval (period), one or more functionalities can be activated (e.g., recording functionality pertaining to an event in the generated VR environment) based on one or more inputs (e.g., but not limited to, gaze inputs). In few scenarios, the computing device may be paired with a VR gear wherein the VR gear can be worn by the user to experience the VR environment and perform one or more actions.

Figure 4:
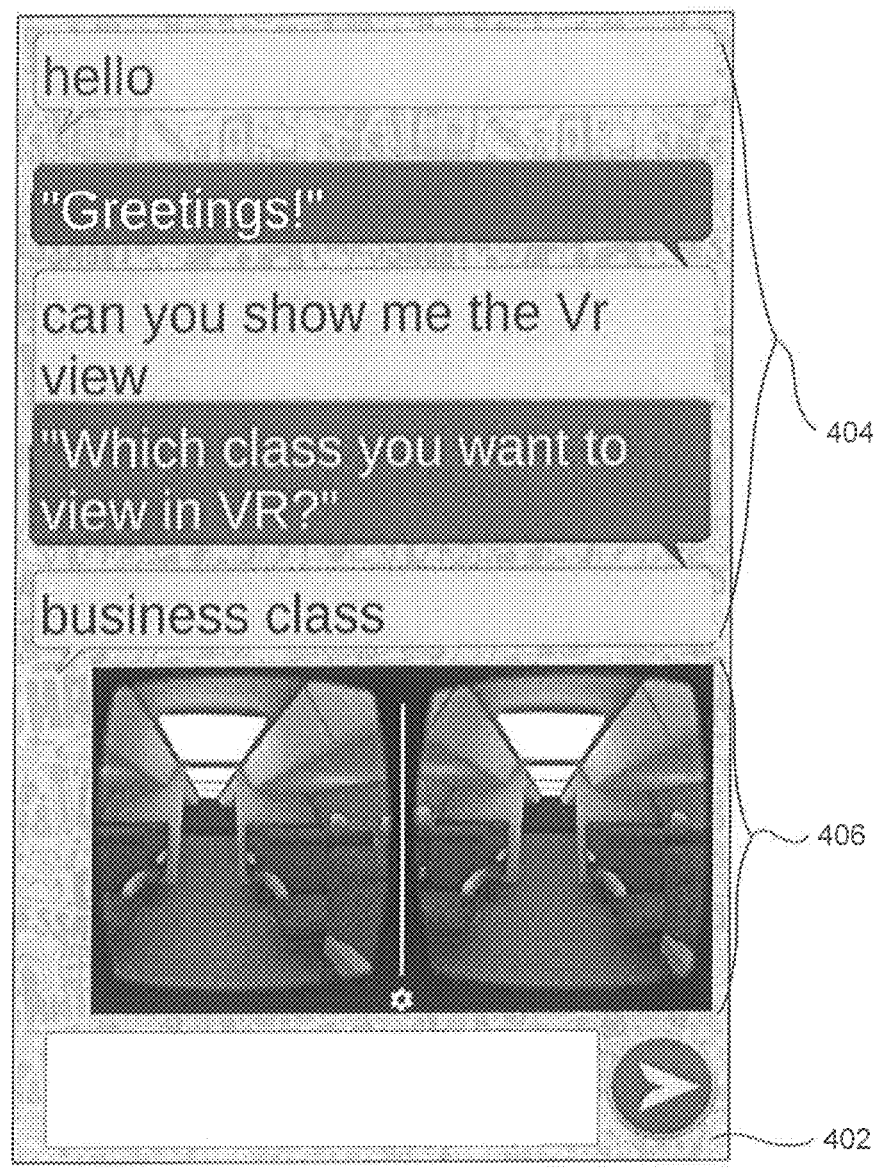
FIG. 4 illustrates an exemplary user interface view depicting an interactive session user interface that is integrated with a VR environment using the adaptive VR assistant application of the system of FIG. 1 according to an embodiment of the present disclosure.

FIG. 4, with reference to FIGS. 1 through 3, illustrates an exemplary user interface view depicting an interactive session user interface that is integrated with a VR environment using the adaptive VR assistant application of the system 100 of FIG. 1 according to an embodiment of the present disclosure. More specifically, FIG. 4A depicts an interactive session user interface, wherein the user and the VR assistant associated with the adaptive VR assistant application 402 engage in an interactive communication session 404 within a VR environment 406. The user provides one or more inputs comprising one or more queries. As can be seen in FIG. 4, the VR assistant provides one or more responses to the one or more queries obtained from the user, and based on the queries received from the user, determines the context, and generates the VR environment 406. For example, as shown in FIG. 4, the user has provided inputs (or queries). For example, queries include, but not limited to, 'can you show me a VR view'. In response to the queries, the VR assistant may either provide responses or ask more questions to user (e.g., 'which class you want to view in VR'). The user has responded to the query by inputting answer (e.g., business class). The adaptive VR assistant has determined the context of the queries and provided (or generated a VR environment that depicts a multi-dimensional (e.g., a 3D VR view) that illustrates an in-flight view of a business class pertaining to the determining context. More specifically, the adaptive VR assistant application generates an in-flight VR environment for a business class within the same interactive communication session of the same user interface as depicted in FIG. 4. Alternatively, the user may provide inputs on the generated VR view mode (e.g., in-flight view) by the adaptive VR assistant application. Upon receiving one or more inputs on option(s) (e.g., click here for full screen of the VR view mode), the VR environment (e.g., the in-flight view) may be provided or displayed on a separate user interface (or disintegrate the chat (or communication session Interface) and the VR view mode (or generated VR environment that depicts an in-flight view of the business class) thus enabling the user to experience the generated VR environment.

In other words, the adaptive VR assistant application help as an assistant to book a flight, to provide walk-through of basic check-in formalities, booking of lounge etc. Using one or more resources (or assets) in the asset repositories, a specific scene is being loaded by understanding the context of the interactive communication session. In an example, a user may be asked to attend basic check-In walkthrough in VR thereby providing him/her one or more options to switch into VR mode for the same. Although, the embodiments of the present disclosure provide an auditorium scenario, and in-flight scenario in VR environments. It is to be understood to a person skilled (or having ordinary skill) in the art that the embodiments of the present disclosure and the proposed system 100 may be implemented of other scenarios, and should not be construed as limiting the scope of the embodiments herein.

The embodiments of the present disclosure provide systems and methods that implement adaptive VR assistant application (having a VR assistant) for providing context based assistance in VR environments. Unlike existing technologies which include Voice over Internet Protocol (VoIP) and video streaming, screen sharing on handheld devices or on consoles which do not include any communication and interaction in virtual reality environment, the system 100 provides an engaging experience to users wherein at both ends the system 100 replicates virtual users. The embodiments of the present disclosure provides a way to interact with the real and 3D persons in virtual spaces, by providing manipulation and control over the view of the person (or users) present in 3D Space. Additionally, the proposed system 100 provides a way to make changes in VR Environment and take decisions in real time (e.g., by way of automation and as well manual technique). Further, the proposed system 100 understands the context from users' media message and guides them based on the understanding extracted from the context and content. Furthermore, the system 100 enables control and dynamic rendering of the content from a remote user. Moreover, the system 100 may enable users to implement the system 100 in one or more computing devices (e.g., computer systems, laptops, mobile communication devices (by pairing them with one or more VR gears) wherein the users can experience the VR environment. For example, users can practice speaking at events/conferences by implementing the system 100 which generates a virtual reality environment (e.g., auditorium), wherein users can speak and can develop skills (e.g., reducing stage fright, and build confidence).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processors) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer implemented method, comprising:
providing an adaptive virtual reality (VR) assistant application executable by at least one processor configured for VR assistance on a computing device;
detecting, by the adaptive VR assistant application, activation of an interface element from a plurality of interface elements, wherein the plurality of interface elements comprises a VR environment interface option and a communication session interface option; and
executing, upon the activation of the interface element, at least one of a first set of instructions and a second set of instructions,
wherein the first set of instructions comprises:
displaying, in a real time, one or more VR environments upon the activation of the interface element;
determining, in the real time, a selection of at least one VR environment from the one or more VR environments by a user;

displaying, in the real time, the at least one selected VR environment comprising one of one or more corresponding objects and one or more VR characters on the computing device, and generating a VR character for the user specific to the at least one selected VR environment;

obtaining, in the real time, a first input comprising a first media message from the user, wherein the first media message comprise a text message;

determining in the real time, using a Natural Language Processing (NLP) engine, a first context based on the first media message, wherein text from the first media message is extracted to determine the first context, wherein a VR environment is rendered based on the text extracted from the media message by the adaptive VR assistant application, and the rendering comprises at least one of selecting and retrieving a determined context based VR environment from the one or more VR environments; and enabling, based on a first determined context, a first interactive communication session between the VR character and the one or more corresponding objects and the one or more presented VR characters in the at least one selected VR environment, and wherein the second set of instructions comprises:

generating an interactive session user interface by the adaptive VR assistant application on the computing device;

obtaining a second input comprising a second media message including one or more queries from the user;

determining a second context of the second input, wherein text from the second input is extracted to determine the second context;

generating, by the adaptive VR assistant application, one or more responses and the one or more VR environments comprising one or more corresponding objects integrated within the generated interactive session user interface, based on one of: the second input, the one or more responses, the second determined context, and any combination thereof, wherein both the generated one or more responses to the one or more queries and the generated one or more VR environments comprising the one or more corresponding objects are displayed within same interactive communication session of the same generated interactive session user interface, wherein the adaptive VR assistant application further enables communication between the user and the one or more corresponding objects in the generated one or more VR environments based on the second determined context within the same interactive communication session of the same generated interactive session user interface, wherein the communication between the user and the one or more corresponding objects in the generated one or more VR environments is enabled by creating a VR character for the user specific to the generated one or more VR environments within the same interactive communication session of the same generated interactive session user interface, and wherein the adaptive VR assistant application further enables the generated one or more VR environments within the same generated interactive session user interface to be maximized based on one or more user inputs provided for full screen view of the generated one or more VR environments and enabling the user to experience the generated one or more VR environments and generating a public speaking simulator, wherein the one or more VR environments are simulated based on user selection and further augmenting the adaptive VR assistant application as a speaker; and extracting, by the NLP engine, at least the text from the first media message, wherein the text is processed to analyze at least one of the first context and the second context and wherein the extracted text is transferred to an asset loader to load content in the one or more VR environments.

2. The computer implemented method of claim 1, wherein the first media message and the second media message further comprises at least one of an audio message, a video message, an audiovisual message, a gaze input, a gesture input, or combination thereof.

3. The computer implemented method of claim 1, further comprising enabling a second interactive communication between the user and the corresponding objects in the generated VR environment based on the second determined context.

4. A computer implemented system, comprising:
a memory storing instructions;
one or more communication interfaces; and
one or more hardware processors coupled to the memory using the one or more communication interfaces, wherein the one or more hardware processors are configured by the instructions to:
provide an adaptive virtual reality (VR) assistant application executable by at least one processor configured for VR assistance on a computing device;
detect, by the adaptive VR assistant application, activation of an interface element from a plurality of interface elements, wherein the plurality of interface elements comprises a VR environment interface option and a communication session interface option; and
execute, upon the activation of the interface element, at least one of a first set of instructions and a second set of instructions,
wherein the first set of instructions comprises:
displaying, in real time, one or more VR environments upon the activation of the interface element;
determining, in the real time, a selection of at least one VR environment from the one or more VR environments by a user;
displaying, in the real time, the at least one selected VR environment comprising one of one or more corresponding objects and one or more VR characters on the computing device, and generating a VR character for the user specific to the at least one selected VR environment;
obtaining, in the real time, a first input comprising a first media message from the user, wherein the first media message comprise a text message;
determining in the real time, using a Natural Language Processing (NLP) engine, a first context based on the first media message, wherein text from the first media message is extracted to determine the first context, wherein a VR environment is rendered based on the text extracted from the media message by the adaptive VR assistant application, and the rendering comprises at least one of selecting and retrieving a determined context based VR environment from the one or more VR environments; and
enabling, based on a first determined context, a first interactive communication session between the VR character and the one or more corresponding objects and the one or more presented VR characters in the at least one selected VR environment, and wherein the second set of instructions comprises:

generating an interactive session user interface by the adaptive virtual reality (VR) assistant application on the computing device;

obtaining a second input comprising a second media message including one or more queries from the user;

determining a second context of the second input, wherein text from the second input is extracted to determine the second context;

generating, by the adaptive VR assistant application, one or more responses and the one or more VR environments comprising one or more corresponding objects integrated within the generated interactive session user interface, based on one of: the second input, the one or more responses, the second determined context, and any combination thereof, wherein both the generated one or more responses to the one or more queries and the generated one or more VR environments comprising the one or more corresponding objects are displayed within same interactive communication session of the same generated interactive session user interface, wherein the adaptive VR assistant application further enables communication between the user and the one or more corresponding objects in the generated one or more VR environments based on the second determined context within the same interactive communication session of the same generated interactive session user interface, wherein the communication between the user and the one or more corresponding objects in the generated one or more VR environments is enabled by creating a VR character for the user specific to the generated one or more VR environments within the same interactive communication session of the same generated interactive session user interface, and wherein the adaptive VR assistant application further enables the generated one or more VR environments within the same generated interactive session user interface to be maximized based on one or more user inputs provided for full screen view of the generated one or more VR environments and enabling the user to experience the generated one or more VR environments and generating a public speaking simulator, wherein the one or more VR environments are simulated based on user selection and further augmenting the adaptive VR assistant application as a speaker; and extracting, by the NLP engine, at least the text from the first media message, wherein the text is processed to analyze at least one of the first context and the second context and wherein the extracted text is transferred to an asset loader to load content in the one or more VR environments.

5. The computer implemented system of claim 4, wherein the first media message and the second media message further comprises at least one of an audio message, a video message, an audiovisual message, a gaze input, a gesture input, or combination thereof.

6. The computer implemented system of claim 4, wherein the adaptive VR assistant application is further configured by the one or more hardware processors to enable a second interactive communication between the user and the corresponding objects in the generated VR environment based on the second determined context.

7. One or more non-transitory machine readable information storage mediums comprising one or more instructions which when executed by one or more hardware processors causes:

providing an adaptive virtual reality (VR) assistant application executable by at least one processor configured for VR assistance on a computing device;

detecting, by the adaptive VR assistant application, activation of an interface element from a plurality of interface elements, wherein the plurality of interface elements comprises a VR environment interface option and a communication session interface option; and executing, upon the activation of the interface element, at least one of a first set of instructions and a second set of instructions, wherein the first set of instructions comprises:
displaying, in the real time, one or more VR environments upon the activation of the interface element;
determining, in the real time, a selection of at least one VR environment from the one or more VR environments by a user;
displaying, in the real time, the at least one selected VR environment comprising one of one or more corresponding objects and one or more VR characters on the computing device, and generating a VR character for the user specific to the at least one selected VR environment;
obtaining, in the real time, a first input comprising a first media message from the user, wherein the first media message comprise a text message;
determining in the real time, using a Natural Language Processing (NLP) engine, a first context based on the first media message, wherein text from the first media message is extracted to determine the first context, wherein a VR environment is rendered based on the text extracted from the media message by the adaptive VR assistant application, and the rendering comprises at least one of selecting and retrieving a determined context based VR environment from the one or more VR environments;
enabling, based on a first determined context, a first interactive communication session between the VR character and the one or more corresponding objects and the one or more presented VR characters in the at least one selected VR environment, and wherein the second set of instructions comprises:
generating an interactive session user interface by the adaptive VR assistant application on the computing device;
obtaining a second input comprising a second media message including one or more queries from the user;
determining a second context of the second input, wherein text from the second input is extracted to determine the second context;
generating, by the adaptive VR assistant application, one or more responses and the one or more VR environments comprising one or more corresponding objects integrated within the generated interactive session user interface, based on one of: the second input, the one or more responses, the second determined context, and any combination thereof, wherein both the generated one or more responses to the one or more queries and the generated one or more VR environments comprising the one or more corresponding objects are displayed within same interactive communication session of the same generated interactive session user interface, wherein the adaptive VR assistant application further enables communication between the user and the one or more corresponding objects in the generated one or more VR environments based on the second determined context within the same interactive communication session of the same generated interactive session user interface, wherein the communication between the user and the one or more corresponding objects in the generated one or more VR environments is enabled by creating a VR character for the user specific to the generated one or more VR environments within the same interactive communication session of the same generated interactive session user interface, and wherein the adaptive VR assistant application further enables the generated one or more VR environments within the same generated interactive session user interface to be maximized based on one or more user inputs provided for full screen view of the generated one or more VR environments and enabling the user to experience the generated one or more VR environments and generating a public speaking simulator, wherein the one or more VR environments are simulated based on user selection and further augmenting the adaptive VR assistant application as a speaker; and extracting, by the NLP engine, at least the text from the first media message, wherein the text is processed to analyze at least one of the first context and the second context and wherein the extracted text is transferred to an asset loader to load content in the one or more VR environments.

8. The one or more non-transitory machine readable information storage mediums of claim 7, wherein the first media message and the second media message further comprise at least one of an audio message, a video message, an audiovisual message, a gaze input, a gesture input, or combination thereof.

9. The one or more non-transitory machine readable information storage mediums of claim 7, wherein the instructions further cause the one or more hardware processors to enable a second interactive communication between the user and the corresponding objects in the generated VR environment based on the second determined context.

* * * * *